United States Patent
Ramirez et al.

(10) Patent No.: US 9,548,626 B1
(45) Date of Patent: Jan. 17, 2017

(54) STAND-OFF CHARGING FOR BATTERIES

(75) Inventors: Ayax D. Ramirez, Chula Vista, CA (US); Shannon D. Kasa, San Diego, CA (US); Stephen D. Russell, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 408 days.

(21) Appl. No.: 12/859,156

(22) Filed: Aug. 18, 2010

(51) Int. Cl.
  *H02J 7/00* (2006.01)
  *H02J 7/35* (2006.01)
(52) U.S. Cl.
  CPC ........................................ *H02J 7/35* (2013.01)
(58) Field of Classification Search
  USPC ......................................................... 320/101
  See application file for complete search history.

(56) References Cited

U.S. PATENT DOCUMENTS

| | | | |
|---|---|---|---|
| 5,631,535 A * | 5/1997 | van der Merwe | 320/102 |
| 7,443,057 B2 | 10/2008 | Nunally | |
| 7,471,062 B2 * | 12/2008 | Bruning | 320/108 |
| 2003/0223756 A1 | 12/2003 | Tatum et al. | |
| 2006/0266917 A1 * | 11/2006 | Baldis et al. | 250/200 |
| 2008/0300660 A1 * | 12/2008 | John | 607/61 |
| 2009/0294576 A1 | 12/2009 | Laforge | |
| 2010/0109445 A1 | 5/2010 | Kurs et al. | |

* cited by examiner

*Primary Examiner* — Robert Grant
(74) *Attorney, Agent, or Firm* — SSC Pacific Patent Office; Arthur K. Samora; Kyle Eppele

(57) ABSTRACT

Power is provided to a remote device by receiving external energy from a laser source and storing the energy in a storage battery. A photovoltaic receiver capable of alignment in a preferred reception direction for receiving energy is used to receive energy from a source of excitement energy, and is configured to receive energy from a laser which is directed to the photovoltaic receiver. A charging circuit receives power from the photovoltaic receiver and is used to charge the storage battery.

1 Claim, 2 Drawing Sheets

STAND-OFF CHARGING FOR BATTERIES

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100345.

BACKGROUND

This subject matter relates to battery charging systems useful for unattended devices and remote sensors, in which the availability of charging energy may be limited.

SUMMARY

Power is provided to a remote device for storage in a storage battery. A photovoltaic receiver is used to receive energy and is capable of alignment in a reception direction for receiving energy from a laser focused on the photovoltaic receiver. A charging circuit receives power from the photovoltaic receiver and is used to charge the storage battery using the energy received by the photovoltaic receiver.

DETAILED DESCRIPTION

Figure 1:
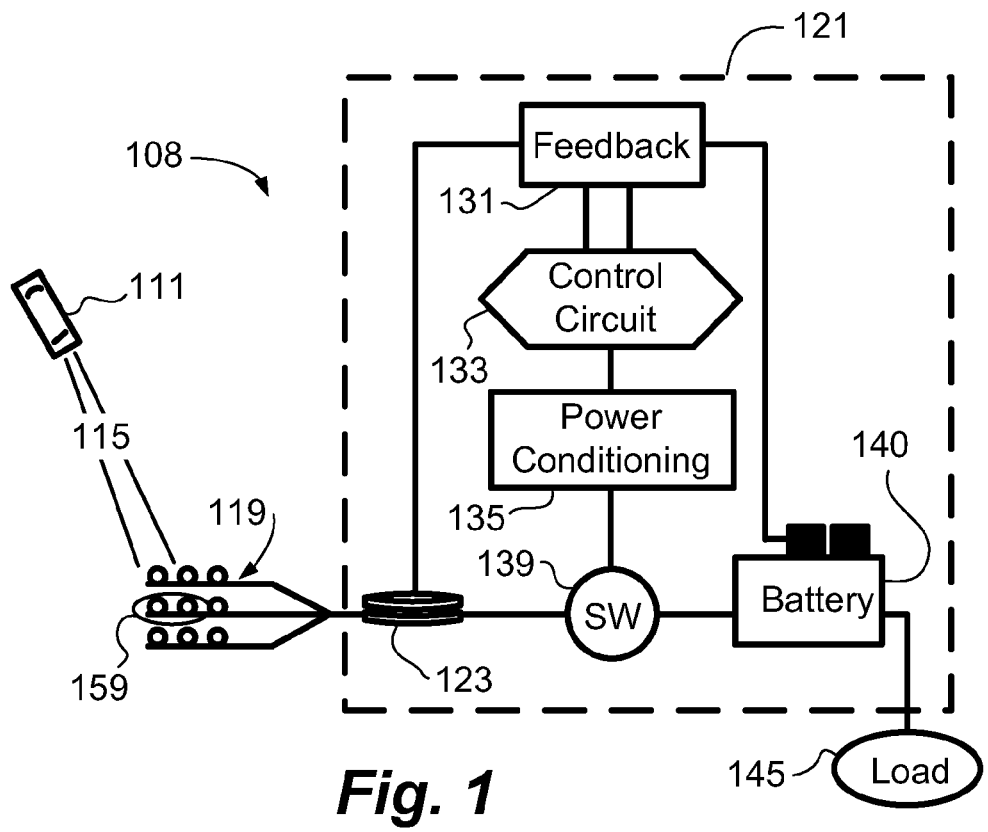
FIG. 1 is a schematic diagram showing a stand-off charging system using a remotely located laser.

Integration of several devices is used to produce a stand-off, fast charging mechanism for batteries.

A non-limiting example of a system in which a stand-off charging system is desired is to provide power to an unattended ground sensor (UGS) system. A UGS system comprises a sensor device, which can be used to detect activity or other conditions from a remote location. Typical applications include perimeter surveillance, advanced intruder detection and other sensing related to an area outside a protected area. Since part of the purpose of the UGS sensor is to detect activity, it is important to keep the UGS as covert as practical, in order to make it difficult for an intruder to avoid detection by the UGS.

The operational life-time for UGS networks strongly depends on the power consumption of the battery employed and the ability to continuously recharge the battery. Typically, a photovoltaic charging mechanism is used to meet the power requirements of the network. During military operations, these UGS networks are usually covert which lowers the efficiency of the photovoltaic charging mechanism due to the reduced exposure to solar energy.

A remote charging system is useful in delivering charge in a fast and reliable manner in covert areas under military operations, while avoiding maintenance and power issues associated with UGS systems.

Batteries, such as the lithium sulfur dioxide ($LiSO_2$), the standard in military applications, are known as primary batteries and are not rechargeable. The type of batteries used in a UGS network are known as secondary batteries, such as lead acid, nickel-cadmium (NiCd), nickel-metal hydride (NiMH), lithium-ion (Li-Ion), lithium-polymer (Li-Polymer), etc. These secondary batteries can sustain a reversible chemical reaction and can be recharged repeatedly, typically up to hundreds of times.

The proper choice of a battery depends on the operational and logistic requirements of the UGS network and the military conditions under which maintenance will be provided to the system and the frequency of the maintenance cycle. For covert UGS networks where it is desired to minimize disturbance and reduce maintenance, the use of a remote charging method is desirable.

NiCd and NiMH battery systems have been utilized using solar power charging methods with the advantage that they do not require any charge control electronics. Li-Ion batteries do require protective and control electronics; however, in many military applications, the UGS networks are covert and the amount of solar power incident on the photovoltaic cells is minimized which can render the system ineffective for long periods of time until enough charge is accumulated to restart normal operations. Charging procedures for most types of batteries involve delivering a constant current or voltage for a given period of time. These procedures are unique to the type of battery selected, as charging procedures are, to a great extent, determined by the photovoltaic cell technology employed.

Batteries have the characteristics of having cell voltages which fall within specific ranges for each battery type. Batteries also have an optimal charge voltage at which the battery charges in an efficient manner without overcharging, excessively heating or otherwise being damaged. The optimum charge voltage is determined by a number of factors, including thermal effects, temperature, internal resistance of the battery, state of charge of the battery, and time available to complete the charging operation. Additionally, the configuration of the battery, for example, series connection of cells, must be taken into account. Examples of optimum charging voltages can be found on car batteries. Car batteries typically have a charged voltage of 12.2 to 12.6 volts, with optimal rates ranging from 13.8 volts to 15.8 volts, depending on the type.

Photovoltaic cells are fabricated from many different semiconductor materials and a variety of compounds of the same. The theoretical conversion efficiency of the photovoltaic cell depends on the band gap of the semiconductor and on the wavelength of the incident light. Terrestrial efficiency is usually determined under standard conditions defined as 25° C. temperature, 100 $mW/cm^2$ insolation and at a specific incident angle through the atmosphere under low scattering conditions.

Solar energy is a conventional way to supply energy to the batteries used in UGS networks. Some UGS applications require several photovoltaic cells to operate, resulting in problems dealing with non-uniform illumination, diode mismatch, and cosine losses that induce significant current degradation in the system.

It is desired to construct a non-intrusive, stand-off system using a laser charging method to meet the power requirements of UGS networks. This may also be applied to commercial systems that are difficult to re-charge in normal operations.

One example configuration for the laser charging system 108 is shown in FIG. 1. FIG. 1 integrates a laser source 111, a beam of electromagnetic energy 115 from the laser source 111, a photovoltaic cell array 119, and a power system 121. Power system 121 includes capacitor 123, a feedback system 131, an electronic control circuit module 133, a power conditioning circuit 135, a switch 139, for example an Micro Electro-Mechanical Systems (MEMS) switch, and a rechargeable storage battery 140. Power system 121 powers load 145, for example a UGS system. Load 145 may include a plurality of loads and the associated means for distribution of the power to the plurality of loads.

The laser source 111 can be a semiconductor laser such as a (AlGa)As laser or any other type of semiconductor laser, a Free Electron Laser (FEL), a simulated FEL-Nd:YAG laser, a Nd:YAG laser, a fiber laser, an Iodine laser system or any other collimated source of amplified energy operating at any wavelength or at multiple wavelengths. The laser source 111 can be operated either continuously or in a pulsed mode. The number of pulses, the power levels, the pulse duration and other properties of the laser source 111 can be varied. Laser sources can be selected depending on the application and the transmission conditions through the atmosphere in order to charge the UGS network 145 remotely from a distance ranging from a few meters to several kilometers. For example, the laser source 111 may be selected to operate at wavelengths that optimally propagate through the atmosphere around 1000 nm, around 1200 nm, around 1600 nm and around 2200 nm or may be selected for optimal detection by the photovoltaic cell array 119 from about 400 nm to about 1500 nm, depending on the specific application.

The laser source 111 generates a beam of electromagnetic energy 115 that propagates either via fiber or through the atmosphere to a photovoltaic cell array 119. This photovoltaic array 119 is a matrix of photovoltaic cells designed to convert the electromagnetic energy 115 generated at the laser source 111 into electrical energy. As depicted, it is possible to energize a portion of photovoltaic cell array 119, as represented at 159.

The electrical energy generated by the photovoltaic cell array 119 is stored in a capacitor 123. Capacitor 123 functions as an intermediate charge receiving circuit, and provides charging system 108 with a capability of absorbing energy at a rate consistent with optimizing energy provided by photovoltaic array 119. The energy stored in capacitor 123 is provided to feedback system 131, electronic control circuit module 133, power conditioning circuit 135 and switch 139 at a rate which optimizes charging storage battery 140. By way of non-limiting example, capacitor 123 can be an electrochemical capacitor with high power, pulsed operation, and long life cycle capabilities. These capacitors are usually referred to as supercapacitors or ultrasupercapacitors. Any type of supercapacitor can be used for this application with a variety of choices for the electrodes, which can be made of one or more oxides of ruthenium, tantalum, rhodium, iridium, cobalt, nickel, molybdenum, tungsten, vanadium, or any other oxide, deposited on a metal foil. Conventional electronic capacitors or any other type of charge storing device can be used in place of the supercapacitor. Capacitor 123 allows the laser charging system to receive energy at rates which may exceed the capacity to charge storage battery 140. It is further contemplated that other devices can be used as an intermediate charge receiving circuit, such as a motor-flywheel combination or other energy storage medium.

Capacitor 123 is not required, provided that the energy provided from the photovoltaic array 119 can be absorbed at an acceptable rate by other means. Capacitor 123 is used because it can be charged and discharged within milliseconds and this process can be repeated thousands of times. This gives the charging system 108 a capability of absorbing energy at a rate which is inconsistent with a proper charge rate for charging of battery 140. Examples of inconsistent charge rates are charge rates that are considered excessive due to overheating, other adverse effects on the battery, or inefficient energy conversion. Capacitor 123 can also function as a backup source to either recharge or replace the battery 140 in the UGS system 145, and allows the charging system 108 to provide a power output to load 145 in excess of the discharge rate of battery 140.

In this charging system 108, the electromagnetic energy 115 generated at the laser source 111 is used to charge capacitor 123 via the photovoltaic cell array 119. This method of charging is especially useful for UGS systems located in remote areas where providing maintenance is not a possibility. It is also very useful in the case of monitoring of roads in enemy territory or the monitoring of environmental conditions (chemical, biological) in remote testing sites.

Also shown is a power circuit which includes feedback system 131, electronic control circuit module 133, power conditioning circuit 135, switch 139 and battery 140. The power circuit provides power to UGS system 145. Feedback system 131 monitors the energy levels of battery 140 and of capacitor 123. The data collected is fed to an electronic control circuit module 133 that determines when the charge of the capacitor 123 should be transferred to the battery 140 in order to maintain the power requirements of the UGS system 145. The discharge is made via a switch 139. Switch 139 can be an electrical switch, an optical switch, a Micro-Electro-Mechanical Systems (MEMS) switch or any other type of switch or actuator that can be remotely activated.

Power conditioning circuit 135 includes power conversion circuitry capable of receiving power from capacitor 123 and optimizing charging voltage supplied to the battery 140 for charging the battery 140. This optimization of power from the power conversion circuitry has the result of providing battery 140 with a charging voltage that provides efficient charging of battery 140 from the power available from capacitor 123, and provides power to battery 140 at a charge rate which will not damage battery 140. It is anticipated that for at least a portion of the charging cycle, capacitor 123 will be connected directly to battery 140 through switch 139.

In cases in which the voltage output of capacitor 123 is at a range consistent with optimal charging of storage battery 140, switch 139 is used to connect capacitor 123 to storage battery 140. In the case of the voltage output of capacitor 123 being outside the optimized charging voltage range of the battery, feedback system 131 senses this condition and causes control circuit 133 to open the connection from capacitor 123 and storage battery 140. Power conditioning circuit 135 is then used receive power from the intermediate charge receiving device and provide an optimized charging voltage range to the battery.

When using lithium-ion batteries, feedback system 131 would be used to compensate for the internal voltage drop (charging current×internal resistance of the battery). Feedback system 131, electronic control circuit module 133 and power conditioning circuit 135 form a subsystem that provides for measurement of the internal voltage drop and that increases the terminal voltage setting by the amount of the internal voltage drop. Ordinarily, a lithium-ion battery is charged at constant current until its terminal voltage attains a set value equal to the nominal full-charge potential. The set-value is chosen as to not exceed the lithium-plating potential, because plated lithium in metallic form constitutes a hazard. When the battery is charged at low temperature, the internal voltage drop can be considerable since the electrical conductivity of the electrolyte is low at low temperature. Charging the battery at high current at any temperature also gives rise to a high internal voltage drop. Since the voltage available for charging is less than the terminal voltage by the amount of the internal voltage drop, the battery is not fully charged even when the terminal voltage reaches a set value. Therefore the feedback system is also used to monitor the internal voltage drop and modify the charging system as required for maximum charging. For example, the charging current can be periodically interrupted so that the zero-current battery terminal voltage can be measured indicative of the state of charge. This can be accomplished by pulsing the incident laser beam, and synchronizing the measurement during the off-state. The difference between the full-current and zero-current voltages would equal the internal voltage drop. The set value of the terminal voltage could then be increased beyond the nominal full-charge potential by the amount of the internal voltage drop. Adjustment can be performed in real-time to maximize charge received from the laser, with an automatic cut-off of charging circuit at maximum charge.

Figure 2:
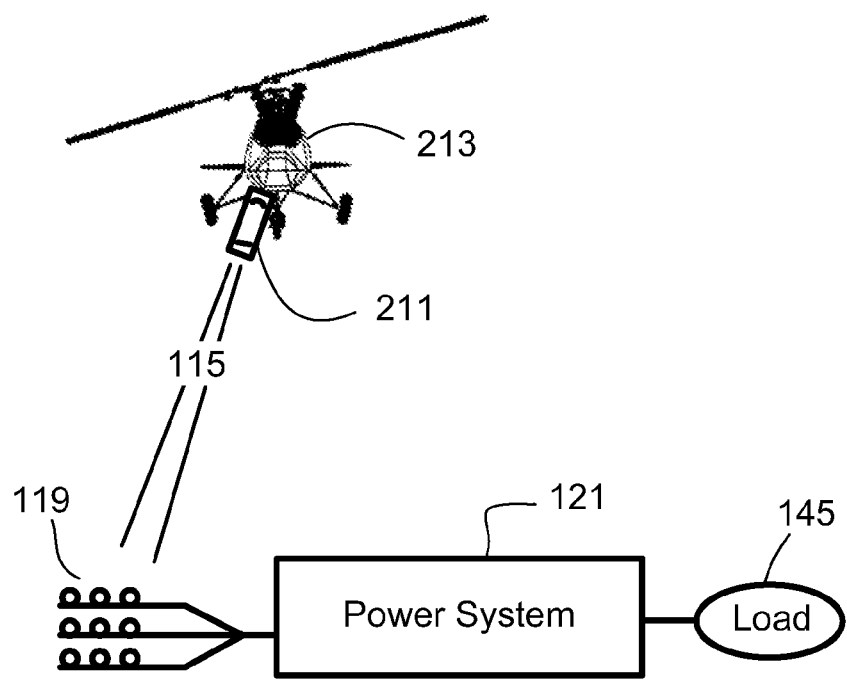
FIG. 2 is a schematic diagram showing remote charging using an unmanned aerial vehicle (UAV) to provide the power source.

Another example configuration of the current subject matter shows that the location of the laser source 111 need not to be fixed. By way of example, FIG. 2 illustrates how illumination could be conducted by mounting laser source 211 on an Unmanned Aerial Vehicle (UAV) 213 in a fly-by operation at a predetermined distance. Laser source 211 can be mounted on any type of aerial vehicle including but not limited to: UAVs, balloons, airplane, etc.

The use of a remote power source provides the ability to improve the charging mechanism utilized in UGS networks. The present subject matter, when used in remote areas where maintenance is not possible, will provide improvements in combat readiness, performance, maintainability and reliability by providing continuous sensor data collection. It will reduce the workload by significantly reducing the amount of time needed to charge or replace the battery in the UGS network. The system will reduce the number of required maintenance personnel, and their training requirements. Combat readiness will benefit from the reliable availability of key laser charging systems.

Nickel-cadmium (NiCd) cells may also be used in some applications. NiCd batteries have a nominal cell potential of 1.2 V, which is lower than the 1.5 V of many popular primary cells. Consequently NiCd cells are not always appropriate as a replacement in all applications; however, the 1.5 V of a primary alkaline cell refers to its maximum, rather than nominal voltage. As compared to common primary cells, a NiCd cell's terminal voltage only changes a small amount as it discharges. Since many electronic devices are designed to work with primary cells that may discharge to as low as 0.90 to 1.0 V per cell, the relatively steady 1.2 V of a NiCd is sufficient to permit normal operation of the same device.

One drawback of the near-constant voltage of NiCd batteries is that the constant voltage makes it difficult to detect when the battery charge is low. When compared to other forms of rechargeable battery, the NiCd battery has a number of distinct advantages. The batteries are more difficult to damage than other batteries, tolerating deep discharge for long periods. In fact, NiCd batteries in long-term storage are typically stored fully discharged. This is in contrast, for example, to lithium ion batteries, which are highly volatile and will be permanently damaged if discharged below a minimum voltage. Also NiCd batteries typically last longer, in terms of number of charge/discharge cycles, than some other types of rechargeable batteries.

NiCd batteries can be charged at several different rates, depending on how the cell is manufactured. The charge rate is measured based on the percentage of the amp-hour capacity the battery is fed as a steady current over the duration of the charge. Regardless of the charge speed, more energy must be supplied to the battery than its actual capacity, to account for energy loss during charging, with faster charges being more efficient. For example, the typical overnight charge, called a C/10 (or 0.1 C) charge, is accomplished by applying 10% of the battery's total capacity for a period of 14-16 hours; that is, a 100 mAh battery takes 140 mAh of energy to charge at this rate. At the rapid-charge rate, done at 100% of the rated capacity (1 C), the battery holds roughly 80% of the charge, so a 100 mAh battery takes 120 mAh of energy to charge (that is, approximately 1 hour and fifteen minutes). Some specialized NiCd cells are capable of being charged in as little as 10-15 minutes at a 4 C or 6 C charge rate, but this is very uncommon and exponentially increases the risk of the cells overheating and venting due to an internal overpressure condition (the cell's rate of temperature rise is governed by its internal resistance and the square of the charging rate). Thus, at a 4 C rate, the amount of power entering the cell is sixteen times higher than the power at the 1 C rate. In such situations, feedback system 131 would monitor and adjust the charging to prevent rise of the battery temperature above 45-50° C. and avoid overcharging, and which could damage the battery.

Figure 3:
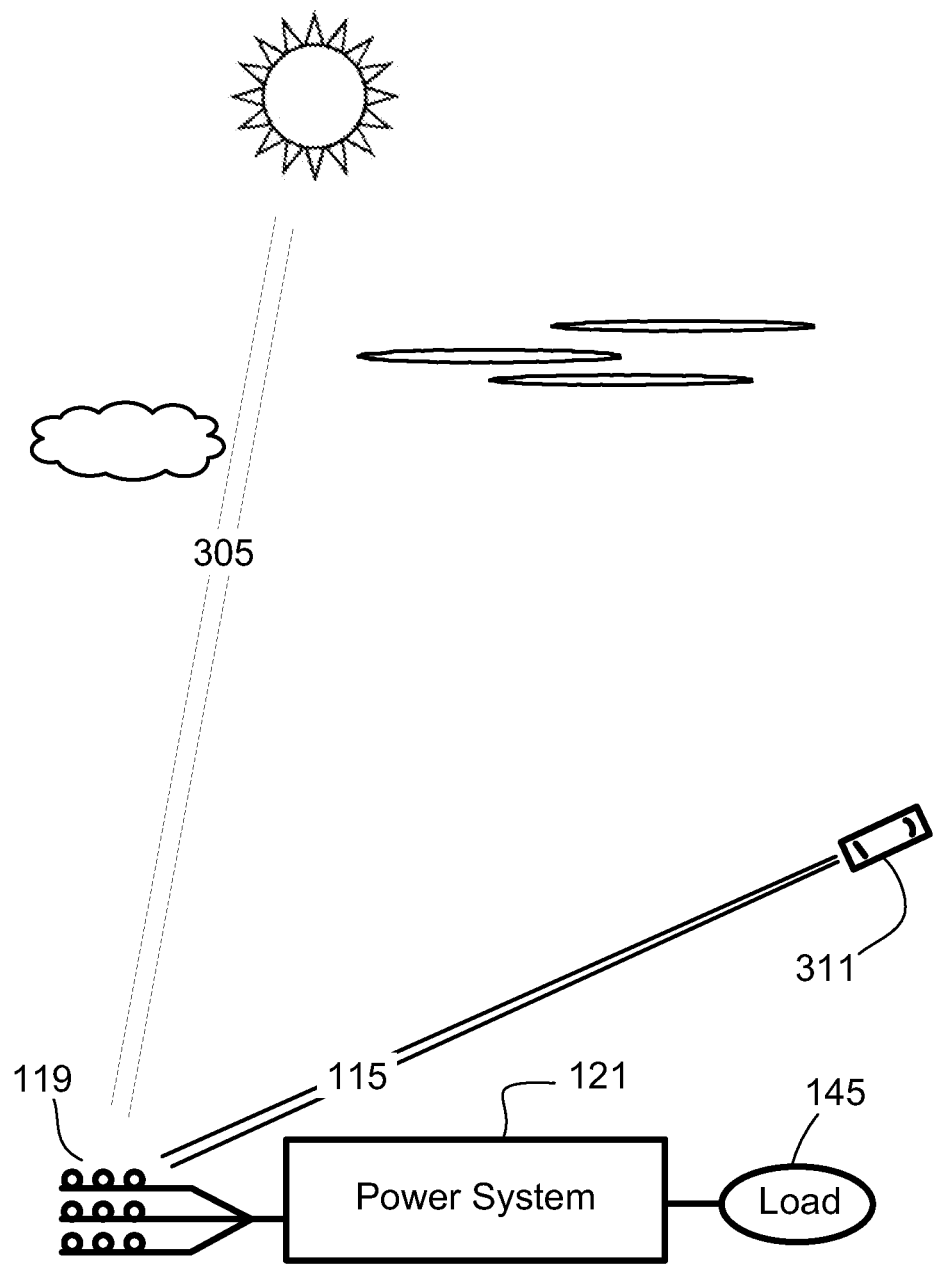
FIG. 3 is a schematic diagram showing remote charging of a ground station which is designed to use solar energy, and which can be remotely charged during periods of limited availability of solar energy.

FIG. 3 is a schematic diagram showing remote charging of a ground station which is designed to use solar energy, and which can be remotely charged during periods of limited availability of solar energy. Photovoltaic array 119 is able to receive solar energy 305; however, this source of power may be deemed unreliable due to local obstructions, clouds or other atmospheric conditions. It is also possible that additional power beyond standby power may be needed under some operational conditions. Laser source 311 would be used in circumstances requiring additional power. Within power system 121, the control circuit module and power conditioning circuit (133, 135, FIG. 1) would be configured to adapt battery charging parameters to optimize conversion of power collected by photovoltaic array 119 from laser source 311, and if necessary, adapt charging parameters to power collected from solar energy.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for providing power to a remote device, comprising:
   providing a pulsed laser having an off-state at a location remote from the remote device;
   providing a storage battery in electrical communication with the device;
   providing a photovoltaic receiver;
   intermittently illuminating said photovoltaic receiver with said pulsed laser;
   providing an intermediate charge receiving circuit in direct electrical communication with the photovoltaic receiver;

charging said intermediate charge receiving circuit with energy obtained from said photovoltaic receiver as a result of said intermittent illuminating;

measuring a voltage drop across said intermediate charge receiving circuit and said storage battery with a feedback circuit; and, synchronizing said measuring step with said intermittent illuminating step so that say measuring step occurs during said off-state of said laser.

\* \* \* \* \*